SELF-COMPENSATING ENCODER

Filed Dec. 29, 1961

INVENTOR
G. G. BAILEY
BY
D. V. De Simone
ATTORNEY

United States Patent Office 3,207,986

Patented Sept. 21, 1965

3,207,986

SELF-COMPENSATING ENCODER

George G. Bailey, New Providence, N.J., assignor to Bell Telephone Laboratories, Incorporated, New York, N.Y., a corporation of New York Filed Dec. 29, 1961, Ser. No. 163,131
5 Claims. (Cl. 325—38)

This invention relates to pulse code modulation (PCM) systems. More specifically, it relates to encoders that convert message samples to a pulse code.

In encoders that employ a weighted network to supply appropriate reference currents to a summing node for comparison with incoming message samples, the network includes switches to switch all conceivable combinations of these reference currents into and out of circuit with the summing node. (See, for example, Patent Nos. 2,449,467 and 2,592,308 and 2,610,295, which issued September 14, 1948, April 8, 1952, and September 9, 1952, to W. M. Goodall, L. A. Meacham, and R. L. Carbrey, respectively.) Now, because of the great speeds at which the reference currents must be switched in time-division PCM systems now being used, mechanical switching is just out of the question. We turn, therefore, to electronic switching, But, whereas mechanical switches are comparatively slow, they are virtually impedanceless when closed, which is not true of electronic switches.

Potentials, small though they may be, develop across active (closed) electronic switches. And, in encoders employing certain types of weighted reference networks (e.g., the various nonlinear networks, disclosed in copending applications by C. P. Villars, Serial No. 853,921, filed November 18, 1959, now Patent 3,065,422, which issued on November 20, 1962, and W. G. Hall, Serial No. 154,-452, filed November 24, 1961), in which shunt switches are used, these potentials can play havoc with the encoding of low-level message samples. Electronic switches, in this sense at least, are nonideal elements, but, in view of their indispensable speed, present-day PCM encoders just have to live with them. It is to this shortcoming of PCM encoders that the present invention addresses itself. And it is thus an object of the invention to improve the accuracy of these encoders.

Very briefly, in accordance with the invention, a corrective network is employed to increase or decrease the quiescent current level at the summing node of an encoder inversely as this level would be changed were all of the encoder's reference switches active during the encoding of a message sample. In an illustrative embodiment, which we will get to in a moment, this corrective network interconnects the summing node and the source from which reference currents are derived. Bias, message, and reference currents converge upon the summing node. The bias current, which biases the input of a comparator and represents the quiescent current level at the summing node when both the reference and message currents have been suspended, is displaced by a predetermined amount one way or the other, depending on the polarity of the message current. This displacement maximally compensates for error current due to the imperfect switching of the reference network switches.

The following description of an illustrative embodiment will afford a better understanding of the invention. In the drawing.

At the outset we should note that although the invention is here described in the context of an encoder of a PCM system, it is equally applicable in a straightforward manner to the system's decoder, for the analogue-to-digital conversion in the encoder has its counterpart in the digital-to-analogue transformation undertaken by the decoder.

Figure 1:
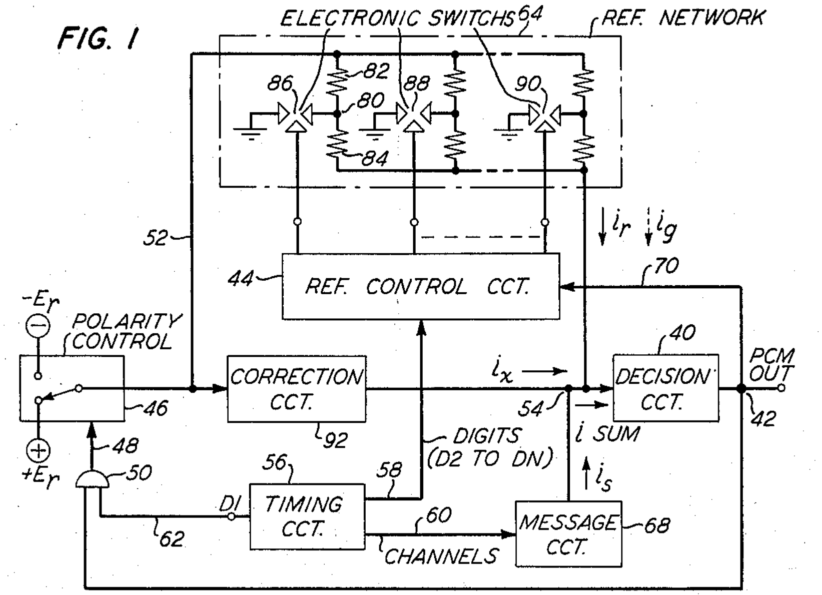
FIG. 1 is a block schematic diagram of a sequential comparison encoder arranged in accordance with the invention.

FIG. 1 depicts a sequential comparison encoder, so-called because the various reference levels of the referent current $i_r$ are sequentially compared with each message sample of the message current $i_s$. FIG. 1 is general in content but sufficiently detailed to facilitate its description and understanding. Each of the block elements, it should be noted, are well known in the art, being disclosed, for example, in one or more of the references already cited.

The decision circuit 40, which must decide at each message-reference comparison whether the resultants current $i_{sum}$ is above or below a specified datum level, is, in essence, a comparator and may be of the type disclosed in the Meacham patent cited above. This datum level (the threshold voltage of the comparator) is recognized by the decision circuit 40 as the effective zero level and is translated into a code value of zero. Henceforth, whenever we speak of $i_{sum}$ being positive or negative, we should understand that this is with respect to the datum level.

The decision circuit 40 has two conditions of stability and will be in one or the other of these states depending on the polarity of the current $i_{sum}$. Let us assume that when $i_{sum}$ is positive that the output of the decision circuit 40 (at the juncture 42) will be a binary "1." Obversely, when $i_{sum}$ is negative, the output of the decision circuit 40 will be a binary "0."

We should note that the current $i_x$ serves to bias the input active element (e.g., a transistor) of the decision circuit 40.

It is the binary state of the juncture 42 that controls, via feedback, the reference control circuit 44 and the polarity control switch 46.

The polarity control switch 46 may be a conventional monostable multivibrator. It is shown in its stable state of equilibrium, connected to $+E_r$. When it is impulsed by the output 48 of and the AND gate 50, it will go into its unstable state of equilibrium, in which state it is timed to remain for the duration of one code group or encoding cycle (the time required to encode one sample of the message current $i_s$).

During its period of instability, the polarity control switch 46 conects the reference bus 52 to negative $E_r$. The reference current $i_r$ will thus be negative (flowing away from the summing node 54), and in position to a positive message sample of the current $i_s$. This is in keeping with our earlier assumption that the binary state of the output 42 of the decision circuit 40 is a binary "1" whenever the current $i_{sum}$ is positive, for at the commencement of each encoding cycle, the current $i_r$ is not present at the summing node 54. Only the bias current $i_x$ and the message current $i_s$ are there manifest. (We ignore, for the moment, the spurious current $i_g$, which is shown dotted alongside $i_r$). Moreover, encodable message samples prevail at the summing node 54, because, in accordance with the invention, intolerable inaccuracies that might otherwise be fostered by the spurious current $i_g$ are avoided, as we shall see when we have considered FIG. 2.

Therefore, in the practice of the invention, it is the current $i_s$ that determines the polarity of the current $i_{sum}$. And, consequently, at the commencement of an encoding cycle, if the current $i_{sum}$ is positive, we know that the message current $i_s$ is positive. We accordingly want the reference current $i_r$ to be negative, and this is precisely what the polarity control switch 46 insures.

The timing circuit 56 synchronizes the various steps in the encoding process. It may, for example, be a synchronizer of the type disclosed by Carbrey or Meacham. Its "digits" output 58 supplies recurrent series of pulses (D2–DN, D2–DN, etc.) to the reference control circuit 44. These pulses are coincident with, and determine the occurrence of, the message digits of each code group. If we assume seven message digits, for example, then during each coding cycle, seven pulses, corresponding to the digits 2 through 8 ($DN=D8$), are sequentially supplied to the reference control circuit 44; after which, the pulse train on the feedback bus 70 permitting, switching stimuli are delivered sequentially to the reference branches (only three of which are shown) in the reference network 64.

At time D1 (the first time slot), the first digit is reserved for polarity information. This digit is supplied via the lead 62 to the AND gate 50. Note, therefore, that it is only at time D1 that the polarity control switch 46 can be affected by the PCM fed back from the juncture 42.

The outputs 62 and 58 of the timing circuit 56 establish the time slots that encompass the digits of the PCM code. The "channels" output 60 provides a pulse once every coding cycle to operate, in sequence, the message samplers (not shown) of the message circuit 68. There are as many samplers as there are message channels and they operate in time division multiplex. Each channel is sampled once in recurring intervals called frames, and the samples ultimately are compared with reference currents at the summing node 54. The make-up of a typical message circuit is exemplified by the above-cited Carbrey patent.

The reference control circuit 44 may also be of the type shown by Carbrey. It comprises conventional bistable circuits (one for each switch of the reference network 64) and logic gates, which together act in response to the timing information from the circuit 56 and the PCM pulses from the decision circuit 40 to switch reference currents into and out of circuit with the summing node 42 according to whether these currents are needed or not.

The switching of the reference currents takes place in the reference network 64. The network 64 is a weighted network of a configuration that may be used, for example, to produce a hyperbolic message-to-code relationship. Each of its resistors bears a precise mathematical relationship to each of the others. These resistors may, for example, be weighted in the proportions suggested by Villars or Hall, respectively, in the patent and copending application cited above. As set forth particularly in the Villars patent, the use of a network of such configuration as to give a hyperbolic relationship between the message and the absolute level represented by the code tends to minimize the quantizing noise introduced by coding.

The network 64 comprises seven branches (only three of which are shown), each associated with a particular message digit of our PCM code. These branches each include a pair of resistors and a switch (shown open in conventional fashion). In view of the high switching speeds involved, mechanical switches are not used. These switches, rather, are electronic (transistors or diodes, for example); and, as we lamented earlier, a potential, which may contribute to prevent the successful encoding of low-level message samples, is developed across each of these switches when it is active. This potential is due to the finite resistance and "contact potential" of the switch. The contact potential of a transistor switch, a likely candidate for our switching job, is defined as the voltage that may exist across the collector-emitter junction of the transistor when its collector current is zero.

An example may be helpful. The juncture 80 of the resistors 82 and 84 is connected to ground by the switch 86 whenever this switch is closed (it is shown open) by a stimulus from the reference control circuit 44. If we assume that the switches 88 and 90 (and all those not shown) are also closed, then ideally we would expect all of the reference current delivered by the bus 52 to go to ground through the switches. But, since these switches have finite resistances and contact potentials when they are closed, part of the current is conveyed as a spurious current $i_g$ to the summing node 54. Insubstantial as this spurious murrent may be, it may nonetheless significantly affect low values of the message current $i_s$.

In accordance with the invention, the spurious current due to imperfections of the network switches is offset by oppositely-directed current from the correction circuit 92. We can see how this is done graphically in FIG. 3, where the bias current $i_x$ and the spurious current $i_g$ shown full strength, which it is when all the switches are active, are plotted against time. The intervals $t_0$–$t_1$, $t_1$–$t_2$, etc., encompass code groups. During each of these intervals a sample of the message current $i_s$ may be encoded. If the switches of the reference network 64 were perfect, we would want the bias current $i_x$ to equal $I_0$ (the datum level) for every sample. As we have noted, however, these switches are not perfect; so we seek, in accordance with the invention, to cancel the spurious currents that they produce. The maximum spurious current $i_g$ and the bias current $i_x$ are balanced against each other to yield the current $I_0$ (the datum level). Now it may be wondered why we are concerned primarily with the full-strength spurious current $i_g$. We are, because the spurious current $i_g$ will nearly reach its maximum when the smallest encodable message sample is being encoded. This is because all but one of the reference switches 86, 88, . . . 90 will be closed during the encoding of such a sample and, hence, contribute to the spurious current. And, whereas considerable error can be tolerated at large message amplitudes, hardly any can be countenanced at low message levels. An example will be helpful.

A positive message sample is assumed during the first coding cycle ($t_0$–$t_1$). At time D1, therefore, the polarity control circuit 46 connects the reference bus 52 to negative $E_r$. During the first time slot, all of the reference switches 86, 88, . . . 90 are closed. Now, if our message sample is at the lowest detectable level, the spurious current $i_g$, due to the switches 86, 88, . . . 90, will render encoding of the sample impossible, since all of these switches except the switch 90, which is associated with the smallest reference current, will ultimately be closed and the resultant spurious current will make it impossible to detect the message sample. The sample will therefore pass unrecognized. This unfortunate result is avoided by the correction circuit 92, which we shall now consider in detail as we proceed to FIG. 2.

Figure 2:
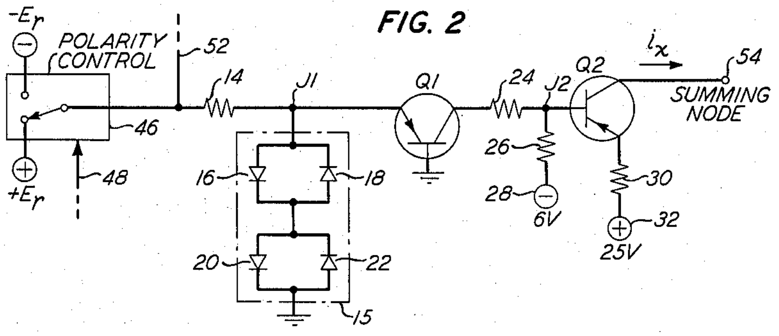
FIG. 2 is detailed schematic diagram of the correction circuit of FIG. 1.

In FIG. 2 let us first consider the elements of the circuit, and then its operation in response to (1) a positive message sample and (2) a negative message sample.

We dealt with the polarity control circuit 46 in FIG. 1. The resistor 14 is a current limiter. It prevents excessive drain of the reference source $E_r$ and connects this source to the junction J1. Coupled to the junction J1 are the diode network 15 and the transistor Q1. The diode network 15, which consists of the diodes 16, 18, 20, and 22, facilitates the switching of the transistor Q1 and prevents excessive voltages from being applied across its base-emitter circuit. This is important, since the transistor has a low breakdown voltage.

The transistor Q1 is the switching center of the circuit. When it is turned ON (which it is when the polarity control circuit 46 is connected to $+E_r$), its collector and the resistor 24 together serve as a constant current source for the junction J2.

The source 28 and the resistor 26 provide the quiescent base bias for the transistor Q2, while the source 32 and the resistor 30 bias the emitter of this transistor. Since the collector current of the transistor Q2 is the bias current $i_x$, this transistor is a current gate that regulates the of $i_x$ to the summing node 54.

We turn now to the operation of the circuit of FIG. 2. Let us first assume that a positive message sample has just been supplied to the summing node 54. As we have seen, this will cause the polarity control circuit to switch over to negative $E_r$, where it will remain for the duration of the sample. Current flows from ground, through the diodes 22 and 18 and the resistor 14, to the source $E_r$. The junction J1 is therefore brought to a negative potential by virtue of the voltage drops across the diodes 18 and 22. This potential is sufficiently negative to turn the transistor Q1 OFF.

Whereas the transistor Q1 is switched ON and OFF, the transistor Q2 is always conductive, since the base of the transistor Q2 is biased negatively by the source 28. When Q1 is turned ON the junction J2 becomes more positive and the transistor Q2 is only partially conductive. Under these circumstances, the collector current $i_x$ of Q2 is at a minimum (the level $I_1$ of FIG. 3).

When the transistor Q1 is turned OFF, however, the junction J2 becomes more negative and the base-emitter current of Q2 increases, driving the transistor Q2 into saturation. The collector current $i_x$ of the transistor Q2 then becomes $I_2$ (see the interval $t_0$–$t_1$ of FIG. 3). At this level, the current $i_x$ compensates for the spurious current $i_g$ in the event that $i_g$ approaches its maximum negative swing, which it will during the encoding of small, positive message samples.

Let us now assume a negative message sample at the summing node 54 of FIG. 1. It will be recalled that in response to such a sample, the decision circuit 40 produces a binary "0" output during the first time slot. The AND gate 50 is therefore not enabled and the polarity control switch 46 remains at rest in its stable state (as it is shown). Current flows from the source $+E_r$, through the resistor 14 and the diodes 16 and 20, to ground. A slightly positive voltage is therefore produced at the junction J1 and the transistor Q1 is turned ON. We have seen that when the transistor Q1 is turned ON, the base-emitter current of the transistor Q2 is reduced. Consequently, the transistor Q2 is only partially conductive. Its collector current $i_x$ is therefore at its lower level $I_1$ (see the interval $t_1$–$t_2$ of FIG. 3). At this level, the current $i_x$ substantially cancels the current $i_g$ when $i_g$ approaches its full positive swing, which it does during the encoding of small, negative message samples.

Figure 3:
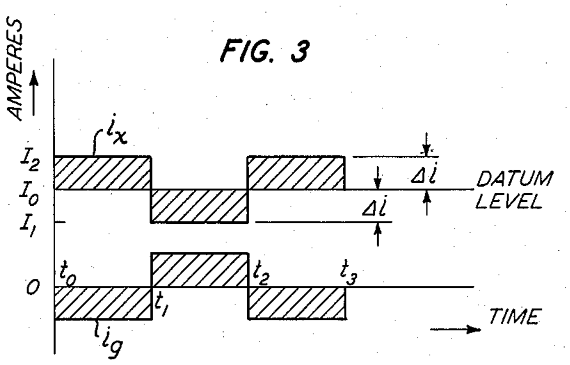
FIG. 3 is a plot of currents versus time.

We may note in passing that the correction circuit 92 of FIG. 1 over-compensates in proportion to the number of reference switches 86, 88, . . . 90 that are open, the spurious current $i_g$ then not reaching its peak negative or positive value; but this is of no consequence since the bona fide reference current $i_r$ increases nonlinearly with the code ($2^0$ to $2^1$ to $2^2$, etc.), and $i_r$ therefore becomes very large in comparison to the increments $\Delta i$ of $i_x$, which delineate the areas shown hatched (shaded) in FIG. 3. Over-compensations by the current $i_x$ may accordingly be ignored.

The invention has been described in the context of an illustrative embodiment and should therefore not be deemed limited to this exemplification.

What is claimed is:

1. An encoder comprising, in combination, a source of message current; a weighted reference current network; a source of bipolar reference potential connected to said network; a source of bias current; a summing node; means for conveying said message, reference, and bias currents to said summing node; means connected to said summing node and responsive to said currents, for converting their alegbraic sum into a train of pulses and spaces descriptive of a pulse code; said weighted network comprising a plurality of weighted resistance branches, one for each message digit of said code; each of said branches including a switch having a finite resistance and contact potential when closed, the switch being closed when enabled, and each of said branches being weighted to contribute a predetermined component of said reference current when its switch is disabled; timing means; and a reference control circuit responsive to said timing means and to said train of pulses and spaces for enabling and disabling the switches of said weighted resistance branches; said source of bias current comprising corrective means for producing increments of bias current which are equal and opposite in phase to the currents conveyed to said node as a result of the potentials due to the finite resistances and contact potentials of said switches when they are all closed.

2. An encoder in accordance with claim 1 in which means are provided for deriving positive potential from said source of bipolar reference potential when said message current is negative and negative potential from said source of potential when said message current is positive; and in which said corrective means comprises a control switch, which is turned ON and OFF in accordance with the polarity of the potentials derived from said bipolar reference potential, and a current regulator which is responsive to said control switch and renders said increments of bias current positive when said control switch is in one of its conductivity states and negative when said control switch is in its other conductivity state.

3. An encoder comprising, in combination, a source of message current; a source of reference current; a source of bias current; a summing node; means for conveying all of said currents to said summing node; means for converting the alegbraic sum of said currents into a train of pulses and spaces descriptive of a pulse code; said source of reference current comprising a weighted network that includes a plurality of switches by which said reference current to said summing node is altered, said switches having a finite impedance and contact potential when closed and diverting part of said reference current to ground when in this condition; said source of bias current comprising a switching device, responsive to the polarity of said reference current, and a current gate, responsive to said switching device, for changing the level of said bias current inversely as the level of said reference current at said summing node is affected by the combined finite impedance and contact potential of said switches when they are all closed.

4. An encoder in accordance with claim 3 in which said switching device comprises a first transistor, used in the common base configuration, whose conductivity state is determined by said polarity of said reference current; and in which said current gate comprises a second transistor, used in the common emitter configuration, whose collector current is determined by the conductivity state of said first transistor.

5. An encoder in accordance with claim 3 in which said switching device comprises a first transistor, said encoder further including a diode network connected to said source of reference current and to said first transistor for deriving a voltage to turn said first transistor fully ON when said reference current is of one polarity and for deriving another voltage to turn it OFF when said reference current is of the other polarity; and in which said current gate comprises a second transistor whose collector current is at one level whenever said first transistor is turned ON, and at another level whenever said first transistor is turned OFF, said collector current of said second transistor being said bias current.

References Cited by the Examiner

UNITED STATES PATENTS

| | | | |
|---|---|---|---|
| 3,021,384 | 2/62 | Brown | 179—15 |
| 3,051,901 | 8/62 | Yaeger | 179—15 |

DAVID G. REDINBAUGH, *Primary Examiner.*